United States Patent Office 3,669,804
Patented June 13, 1972

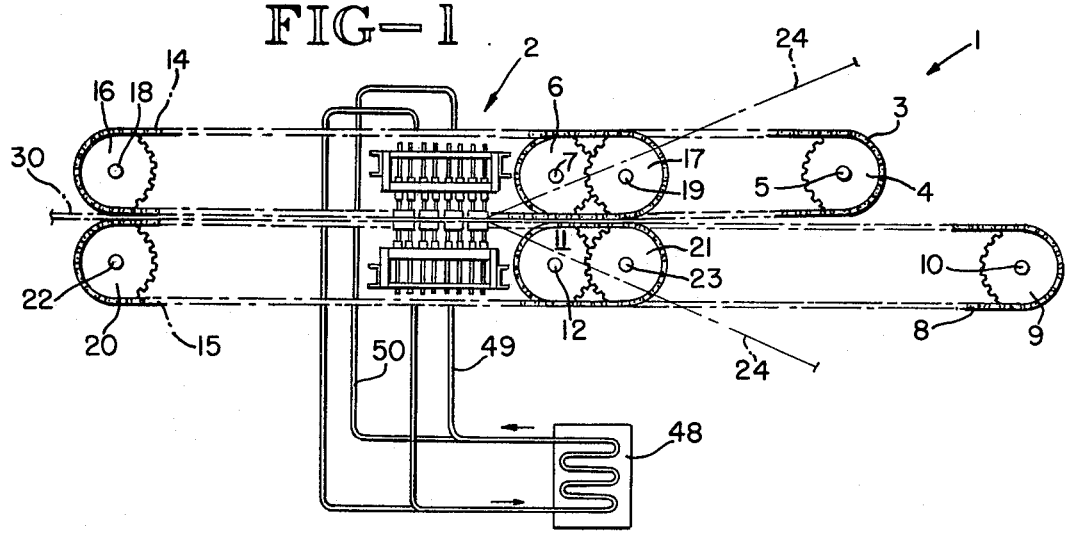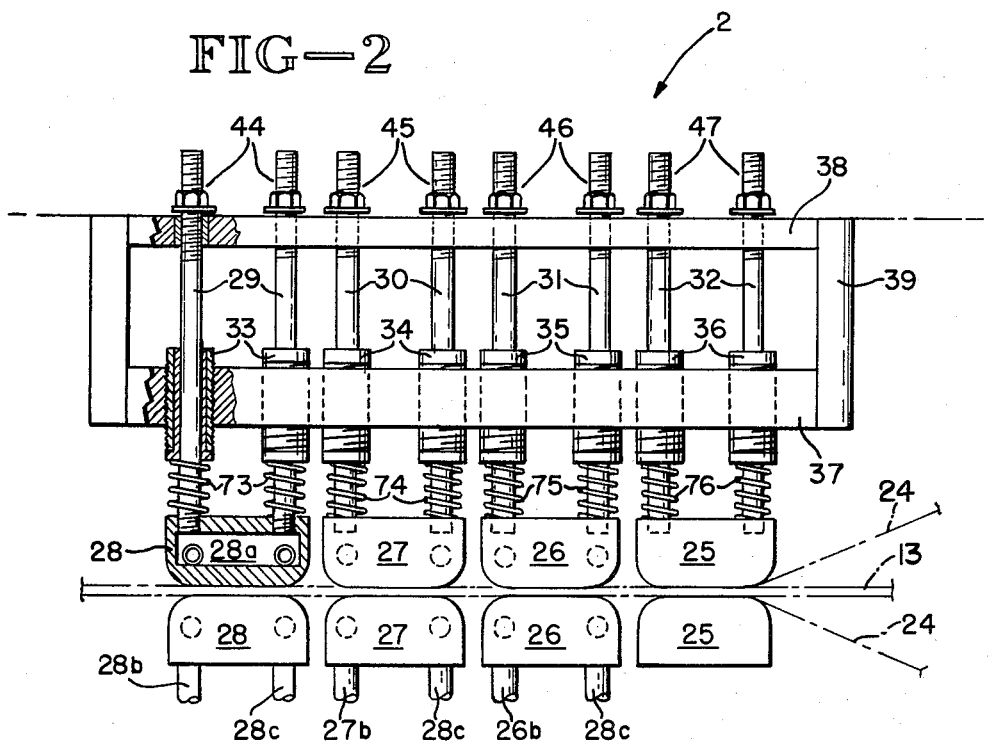

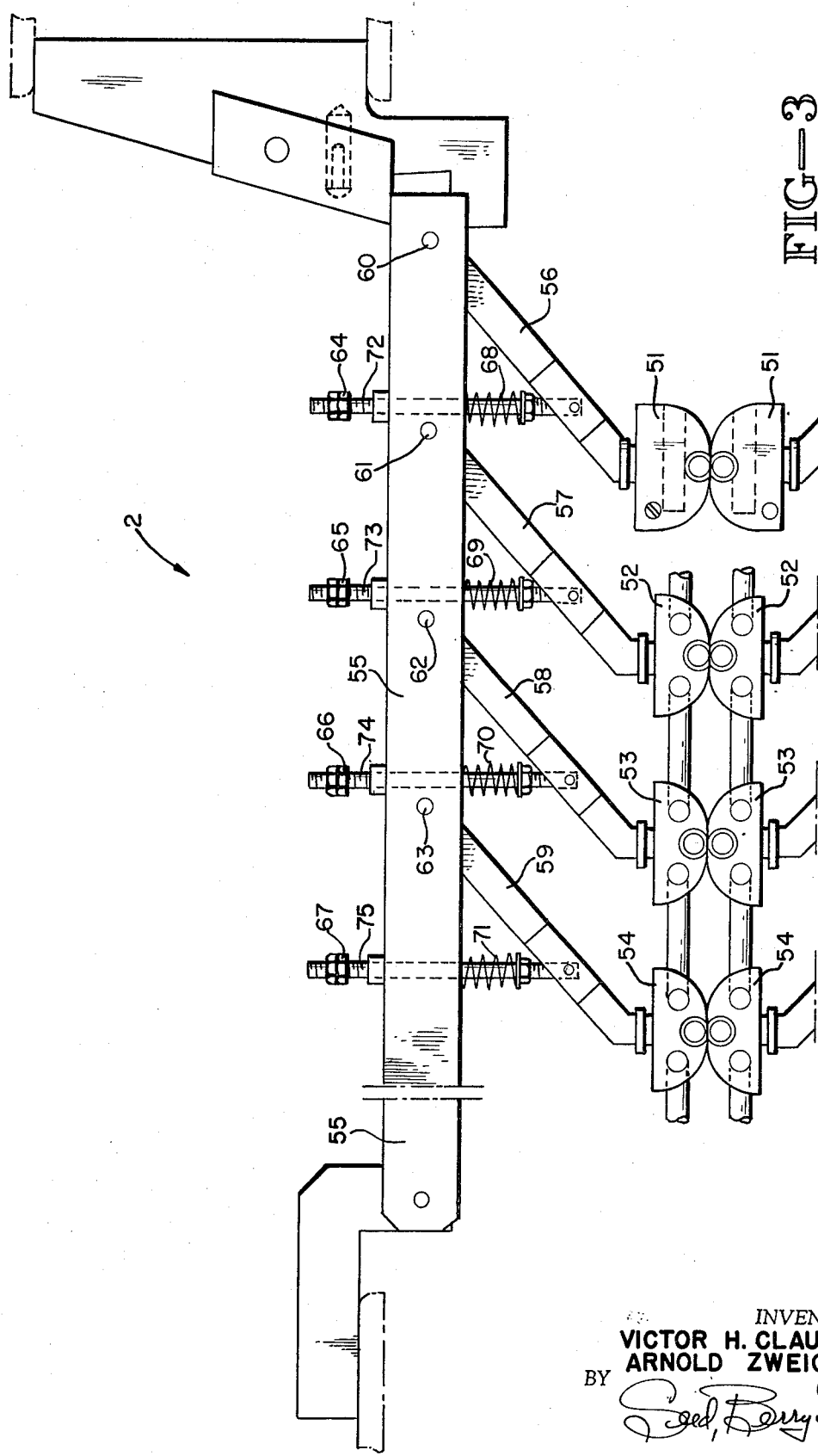

3,669,804
APPARATUS FOR BONDING CONTINUOUS FLEXIBLE STRANDS COATED WITH A THERMOPLASTIC ADHESIVE TO THE SURFACE OF MOVING VENEER STRIPS
Victor H. Clausen, Bellevue, and Arnold Zweig, Olympia, Wash., assignors to Simpson Timber Company, Seattle, Wash.
Filed May 11, 1970, Ser. No. 35,978
Int. Cl. B32b *31/20, 31/10*
U.S. Cl. 156—544                                      5 Claims

ABSTRACT OF THE DISCLOSURE

Continuous, flexible strands having a thermoplastic adhesive applied thereto are continuously bonded to crowded together strips of random width wood veneer by means of multiple, independently mounted shoe members in pressure contact with the surface of the veneer, the shoes being of a length to follow undulations which occur in veneer sliced from a log with a rotary lathe. The first of the shoes contacting the adhesive coated strands is heated to keep the thermoplastic adhesive on the strands in a flowable state as they pass under and are pressed against the surface of the veneer strips. The remainder of the shoes are cooled with a cooling medium to cool the adhesive on the strands sufficiently to bond the strands to the veneer surface.

BACKGROUND OF THE INVENTION

Field of the invention

This invention relates to an applicator means for pressing continuous flexible strands onto the surface of crowded together random width wood veneer strips.

Prior art relating to the disclosure

A continuous system for bonding crowded together random width veneer pieces with continuous flexible strands coated with a thermoplastic adhesive is known as disclosed in United States Pat. No. 3,445,313. In the system disclosed in the patent the flexible strands are pressed onto the surface of the veneer strips by a one-piece pressure shoe which has a heated toe portion and a cooled heel portion. When a one-piece shoe is used a continuous adhesive bond between the surface of the veneer and the strands is difficult to achieve because of the wavy surface of the veneer pieces along their width. It is known that veneer peeled from a peeler log with a rotary lathe can develop undulations along its end grain edges during or after drying, and also has a tendency to curl upward along its end grain edges. These undulations prevent adequate bonding between the strands and the veneer surface along their entire width.

It is a primary object of this invention to provide a means of bonding continuous flexible strands coated with a thermoplastic adhesive to veneer strips having undulated surfaces.

It is a further object of this invention to provide a means of bonding continuous strands coated with a thermoplastic adhesive to the surface of veneer strips using multiple, independently mounted shoes mounted for vertical movement to a common frame, the shoes spring biased into contact with the surface of the veneer strips, the shoes having a length capable of following the undulations in the veneer sheets.

BRIEF DESCRIPTION OF THE DRAWINGS

FIG. 1 is a cross sectional view of the overall apparatus including a means for moving the veneer strips through the applicator station and applicator means for bonding the continuous adhesive coated strands to the surface of the veneer strips;

FIG. 2 is an expanded sides elevational view of the applicator means of FIG. 1 with one of the shoes and its mounting means shown in section; and FIG. 3 is an expanded side elevational view of an alternate applicator means.

DESCRIPTION OF THE PREFERRED EMBODIMENT

Referring to the drawings, FIG. 1 illustrates the overall system and includes a crowder 1 and strand applicator means 2. The crowder 1 is a conventional piece of equipment which functions to move individual veneer pieces into tight edge-to-edge abutment and to maintain them in this condition until they are joined together by the continuous flexible strands. The crowder shown in the drawings is an endless chain crowder which includes laterally spaced endless top chains 3 trained about a first row of spaced sprockets 4 carried on transverse shaft 5 and a second set of sprockets 6 spaced along transverse shaft 7. The transverse shafts 5 and 7, and other structures to be described for the crowder, are supported by a suitable framing structure (not shown).

A similar set of spaced endless chains 8 is located directly beneath and in vertical alignment with the endless chains 3. The chains 8 are trained about a first set of sprockets 9 carried on transverse shaft 10, and a second set of sprockets 11, carried on transverse shaft 12. The top chains 3 and the bottom chains 8 are driven by a suitable drive means such as a motor connected to the endless chains 3 and 8 by a drive chain or other suitable means. The chains 3 and 8 are spaced a slight distance apart to allow them to engage and convey individual pieces of wood veneer 13 between them. The distance between the upper and lower set of chains is adjustable and means are provided to maintain a slight pressure on the chains and the surfaces of the veneer pieces.

The crowding of the veneer pieces into tight edge-to-edge contact is accomplished by means of a third set of upper chains 14 and a fourth set of lower chains 15 which overlap the ends of chains 3 and 8 as shown in FIG. 1. The top chains 14 are trained about first and second sets of sprockets 16 and 17 carried by transverse shafts 18 and 19 respectively, the shaft being journalled by suitable means to the overall frame structure. The bottom chains 15 are trained about sprockets 20 and 21 carried by transverse shafts 22 and 23 respectively. The sets of chains 14 and 15 are driven in the same relative direction as chains 3 and 8 by the veneer pieces 13 therebetween as they are forced by chains 3 and 8. The chains 14 and 15 are adjustably pressured against the veneer pieces 13 in order to hold them as flat as possible, although a certain amount of waviness or undulation cannot be avoided. The crowding action of the veneer pieces is accomplished by the driving action of chains 3 and 8 and the retarding action of chains 14 and 15. Thus the veneer pieces are tightly abutted and maintained in this position while they are between chains 14 and 15.

The top runs of chains 8 may be forced upwardly by means of a pneumatic pressure hose (not shown) which is expanded against a transverse pressure bar acting on the chain guides. Likewise the upper runs of chains 15 may be urged upwardly by means of a similar pneumatic hose expanded against a transverse pressure bar acting against the chain guides. The means for adjustably applying pressure to the crowded chains described is exemplary only and any equivalent means may be utilized.

According to the present invention, applicator means are provided in cooperation with the crowder for bonding continuous flexible strands of high tensile strength material, preferably glass fiber strands, at a plurality of positons on either the upper or lower or both faces of the veneer pieces 13 passing through the crowder. The preferred strands used are commercially available and are described as continuous filament yarn fiber glass strand roving. Glass fiber strands are preferred because of their low cost and high tensile strength. They are preferably adhered to the surface of the wood veneer in an untwisted condition so that they may be flattened down on the surface of the wood veneer, thereby offering little interference with the glue line of a plywood panel or other material laminated to the surface of the held-together veneer pieces. Although it is not shown, the continuous strands of fiberglass 24 are coated with a thermoplastic or "hot melt" adhesive prior to being led under the applicator means 2. The thermoplastic adhesive may be any one of a wide variety of synthetic resins suitable for forming a strong bond between the strands and the wood veneer surface. The strands are pressured against the surface of the wood veneer while the thermoplastic adhesive is in the flowable state. If desired the strands coated with the thermoplastic adhesive may be passed through a tubular conduit (not shown) directly adjacent where the strands pass under the applicator means 2, the tubular conduit heated by suitable means to maintain a thermoplastic adhesive on the strands in the flowable state.

The applicator means 2, as shown in FIGS. 2 and 3, for applying the adhesive coated strands to the surface of the veneer strips and bonding it thereto include a series of shoes independently mounted to a common frame, the first of the shoes being heated and the remainder of the shoes cooled by suitable cooling medium. FIGS. 2 and 3 show the applicator means in detail. If needed, more than one set of the shoes may be heated.

Referring to FIG. 2, the applicator means 2 includes a plurality of shoe members 25, 26, 27 and 28 having upstanding guide rods 29, 30, 31 and 32 threaded to the shoe members, the guide rods passing through bushings inserted into the lower end of guide tubes 33, 34, 35 and 36. The guide tubes are threaded into bores of lower guide bar 37 of frame 39. The guide rods then are passed through complementary bores in the upper guide bar 38 and held in place by nuts 44, 45, 46 and 47. The shoe members 25, 26, 27 and 28 are spring biased downardly by means of coil springs 73, 74, 75 and 76 which bias shoes 25, 26, 27 and 28 into continuous contact with the surface of the veneer pieces 13. The spring pressure is adjusted by means of the threaded guide tubes 33, 34, 35 and 36.

The length of each of the independent shoes is critical to establishment of a substantially continuous adhesive bond between the veneer pieces and the continuous strands. If the shoe members are too long they are incapable of following the undulations in the veneer pieces and, therefore, a substantially continuous bond between the veneer pieces and continuous strands is not possible. An individual shoe length ranging from 2½ to 3 inches has been found to be optimum.

If the continuous strands are applied to both the upper and lower surfaces of the crowded-together veneer strips a set of independently mounted lower shoes is placed directly beneath the set of upper shoes, the independently mounted lower shoes adapted to continuously press the adhesive coated strands into contact with the moving veneer surfaces and, by cooling of the adhesive, bond the strands to the veneer surface. The lower shoes are mounted in the same manner as the upper shoes.

The first shoe member 25 is heated by suitable means such as an electrical resistance heat unit with the portion having a heated surface contacting the moving veneer pieces for applying pressure and heat to the adhesive-saturated glass fiber strands on the surface of the moving veneer pieces. Although only one heated shoe is shown more may be provided if desired and the heating tubes referred to eliminated. In the remaining shoe members 26, 27 and 28 cooling chambers are formed internally in the body of the shoes. Only one chamber 28a is shown in FIG. 2, however, it is representative of the chambers in shoe members 26 and 27. The cooling chambers are adapted to receive a cooling medium such as cold water through inlet conduits 26b, 27b, and 28b. The cooling medium is circulated through a heat exchanger 48 through tubes 49 and 50. Cooling medium flows continuously from the respective supply conduits 26b, 27b and 28b through the internal chambers of the shoe members, to outlet conduits 26c, 27c and 28c. Identical cooling chambers are provided for both the upper and lower shoe members. If desired a connecting conduit may be connected between the upper cooling shoes and the lower cooling shoes. Thus the cooling chambers of the shoes above and below the moving veneer are constantly supplied with a cooling medium to ensure setting of the thermoplastic adhesive-impregnated glass fiber strands as they are pressed against the moving veneer surfaces. The shoe structure and strand applying means beneath the veneer pieces are identical in structure and operation with that described above.

An alternative mounting of the shoes is shown in FIG. 3. Shoe members 51, 52, 53 and 54 are mounted for vertical movement relative to the fixed common horizontal mounting frame 55. Elbow arms 56, 57, 58 and 59 are secured at one end to the individual shoe members and, at the opposite end, are pivotally mounted to frame 55 at pivot points 60, 61, 62 and 63. Guide rods 72, 73, 74 and 75 are pivotally connected at one end to the individual shoe members and, at the opposite end, are pivotally mounted to frame 55 at pivot points 60, 61, 62 and 63. Guide rods 72, 73, 74 and 75 are pivotally connected at one end to the elbow arms and extend upwardly through bushings threaded into bores of the horizontal common mounting frame 55. Stop nuts 64, 65, 66 and 67 are threaded on the upper portion of each of the guide rods and limit the downward travel of the shoes. Springs 68, 69, 70 and 71, mounted as shown, bias the shoes downwardly. The spring pressure is regulated by means of the nuts directly below each of the springs. Shoe 51 is heated by an electrical resistance heater or other suitable means. The remaining shoes are preferably cooled. Cooling chambers are provided in the cooling shoe members as well as inlet and outlet conduit for the cooling medium as described with respect to FIG. 2. The lower shoe members are identical with the upper shoe members.

The adhesive coated strands, on entering under the first set of heated shoes, are flattened and spread out over the veneer surface to greatly reduce their thickness. The heated shoes ensure bonding of the glass fiber strands to the veneer surfaces by heat and pressure. The cooled shoes downstream from one or more of the heated shoes result in complete setting of the thermoplastic adhesive to bond the strands to the wood veneer surfaces by the time the strands emerge from beneath the shoes. Because the shoes are independently mounted any undulation occurring in the veneer strips 13 is compensated for by relative movement of the independently mounted shoes. Complete and continuous contact between the veneer pieces and the continuous flexible strands is possible with better bonding between the two with minimal likelihood that the veneer pieces will fall apart from each other on emergence from the applicator means.

By utilizing multiple, independently mounted shoes which are separately articulatable, a continuous bond between the adhesive coated glass fiber strands and the surfaces of wood veneer is provided enabling the production of continuous core veneer of adequate strength for latter handling in the manufacture of lay-up of plywood.

The embodiments of the invention in which an exclusive property or privilege is claimed are defined as follows:

1. In an apparatus for bonding continuous, flexible strands having a thermoplastic adhesive applied thereto to the surface of a series of moving veneer strips in edge-to-edge abutting relation having means for moving the veneer strips in abutting relation and applicator means for bonding the strand to the veneer surface, the applicator means comprising:

a fixed mounting frame, multiple, independent shoes mounted for vertical movement relative to said frame and biased into contract with the surfaces of the veneer strips to press adhesive coated strands onto the moving surfaces of the veneer strips, each of the shoes being of a length to follow undulations occurring across the width of the moving veneer strips, heating means supplying at least the first of the shoes with sufficient heat to keep the thermoplastic on the strands in a flowable state as they pass thereunder and are pressed against the moving surfaces of the veneer strips, and cooling means supplying the remainder of the shoes to cool the adhesive on the strands to form a substantially continuous bond between the strands and the veneer surfaces enabling production of continuous veneer of adequate strength for subsequent handling in the manufacture and lay-up of plywood.

2. The apparatus of claim 1 wherein continuous flexible strands are applied to both the upper and lower surfaces of a series of moving veneer strips and wherein the applicator means includes a second fixed mounting frame directly opposite and below the upper mounting frame, and a second series of multiple, independent shoes mounted thereon of substantially the same structure and function as the shoes directly above.

3. The apparatus of claim 1 wherein each of the shoes is mounted to a common frame and wherein the individual shoes are spring biased into contact with the veneer strips.

4. The apparatus of claim 1 wherein each of the cooling shoes is hollow for receiving a cooling medium therein.

5. The apparatus of claim 1 wherein each of the shoes has a length measured in the direction of movement of the veneer strips of 2½ to 3 inches.

References Cited

UNITED STATES PATENTS

| | | | |
|---|---|---|---|
| 3,377,223 | 4/1968 | Clausen | 156—166 |
| 2,767,113 | 10/1956 | Bower | 156—176 X |
| 2,373,376 | 4/1945 | Bolling | 156—558 X |
| 3,284,267 | 11/1966 | Buck et al. | 156—179 X |
| 3,445,313 | 5/1969 | Clausen et al. | 156—433 |

BENJAMIN A. BORCHELT, Primary Examiner

J. M. HANLEY, Assistant Examiner

U.S. Cl. X.R.

156—176, 304, 558